2,552,499

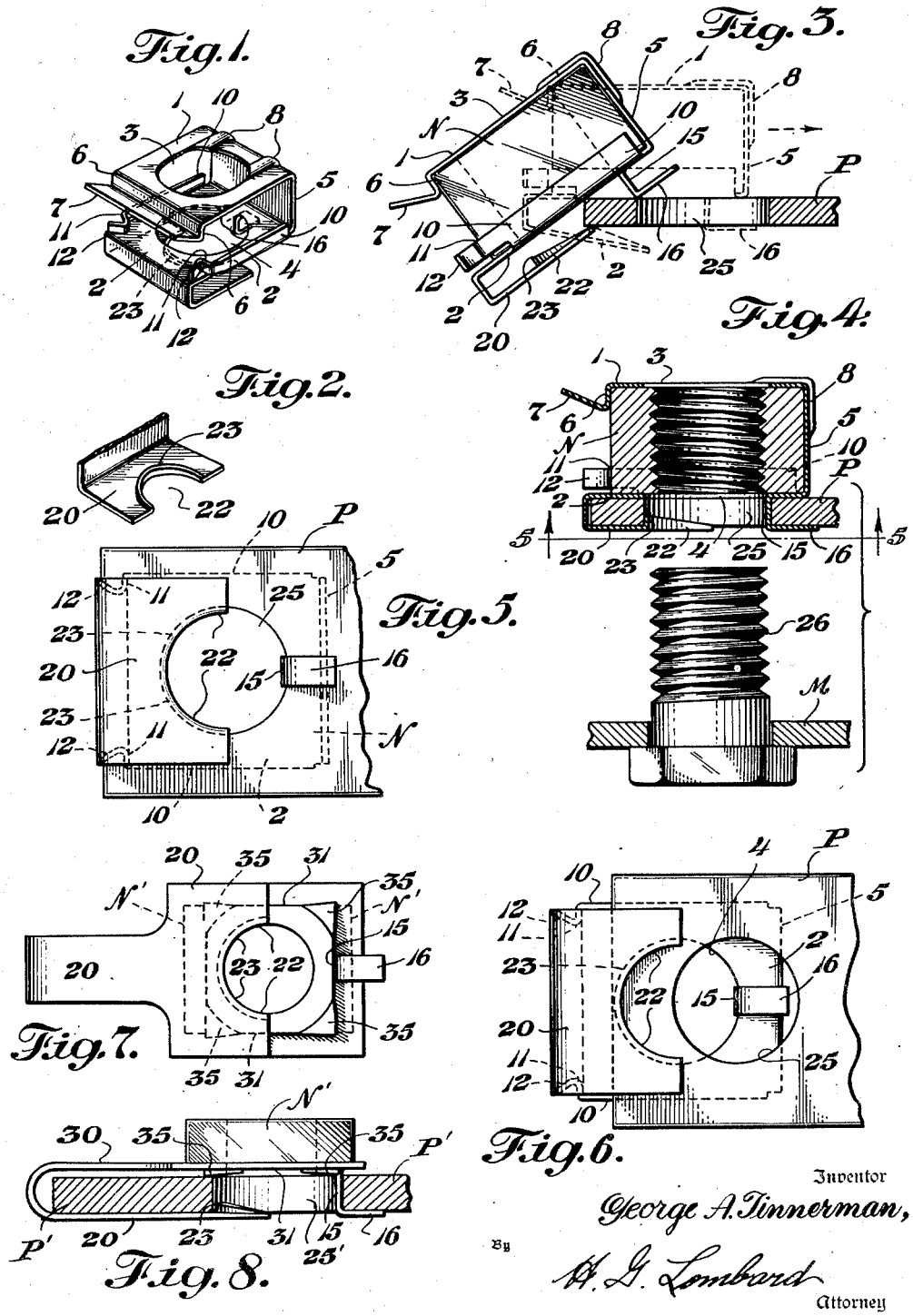
May 8, 1951 — G. A. TINNERMAN — 2,552,499
NUT ANCHORING DEVICE
Filed May 22, 1947 — 2 Sheets-Sheet 1
Inventor
George A. Tinnerman,
By H. G. Lombard
Attorney May 8, 1951   G. A. TINNERMAN   2,552,499
NUT ANCHORING DEVICE
Filed May 22, 1947   2 Sheets—Sheet 2
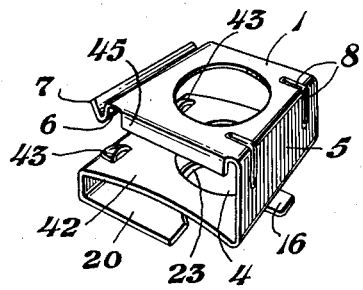
Fig. 9.
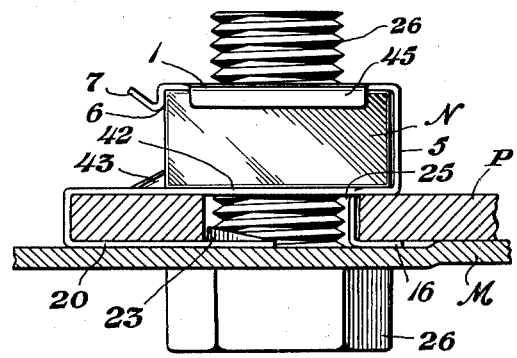
Fig. 10.
Fig. 11.   Fig. 12.
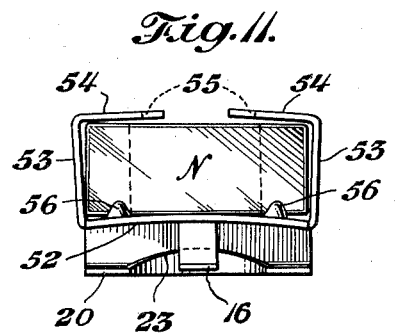   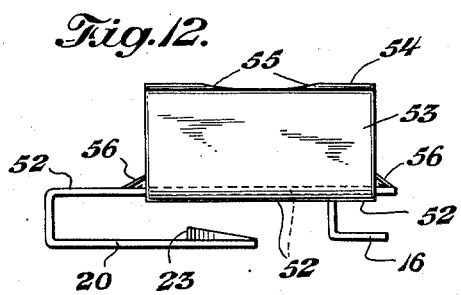
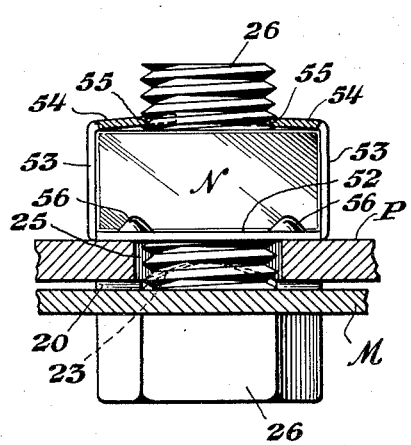
Fig. 13.
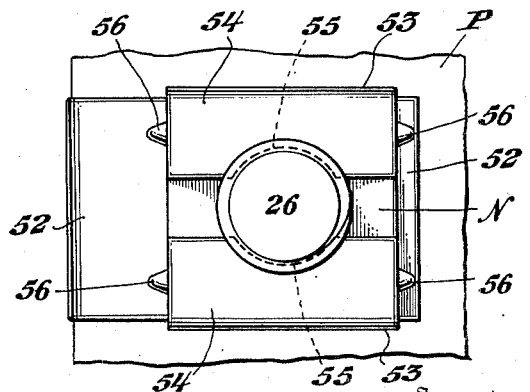
Fig. 14.
Inventor
George A. Tinnerman,
By H. G. Lombard
Attorney Patented May 8, 1951

UNITED STATES PATENT OFFICE 2,552,499

NUT ANCHORING DEVICE

George A. Tinnerman, Cleveland, Ohio, assignor to Tinnerman Products, Inc., Cleveland, Ohio, a corporation of Ohio Application May 22, 1947, Serial No. 749,757

2 Claims. (Cl. 151—33)

This invention relates in general to nut fastened installations and deals, more particularly, with improvements in nut holding devices for attaching standard nuts, tapped plates, and the like, in fastening position in an assembly prior to the application of a cooperating bolt or similar fastener thereto for securing the parts of the installation.

In many assemblies, it is necessary or desirable to use a standard nut and bolt fastening means but it is usually a difficult problemr, especially in blind locations, for the operator to hold the nut in place as the bolt is applied, or otherwise, to maintain the nut against rotation during the final tightening of the bolt therewith. In most assemblies in which the rearward side of a part is not conveniently or readily accessible for holding a nut in fastening position prior to application of the bolt, it is necessary to resort to some form of riveting, welding or other attaching means for retaining the nut in fastening position.

In the average installation requiring a cheap, inexpensive nut holding means, the cost of welding, or riveting clinch-on nut holding devices, and the like, generally is so expensive as to make the use thereof prohibitive. Similarly, sheet metal, cage type of nut holding devices heretofore available are objectionably expensive and complicated, and otherwise disadvantageous in requiring an entirely inordinate amount of time for attaching the same in fastening position in an installation.

A primary object of the present invention, therefore, is to provide an improved sheet metal nut holder or retainer which is relatively simple and inexpensive to manufacture and includes in its construction a simplified, easily and quickly applied clip type of attaching means in the form of a pair of cooperating spring arms adapted to clasp a part adjacent a bolt opening therein to hold the nut in attached fastening position over said bolt opening, together with an auxiliary supporting hook adapted to engage a marginal portion of the bolt opening to reinforce and rigidify the nut holder in such attached fastening position.

A further object of the invention is to provide a nut holder of this character comprising a pair of arms for embracing the apertured part to which the nut is to be attached, together with means on one of said arms adapted to lock the nut holder in attached fastening position in conjunction with the said auxiliary supporting hook.

Another object of the invention is to provide a nut holder such as described in which the locking means on one of the arms of the nut holder is designed to serve also as a locating or positioning element for guiding the nut holder in the application thereof to attached fastening position.

Further objects and advantages and other new and useful features in the construction, arrangement and general combination of parts of the invention will be readily apparent as the following description proceeds with reference to the accompanying drawings, for purposes of illustration but not of limitation, in which like reference characters designate like parts throughout, and in which:

Figure 1 is a perspective view of one form of the improved nut holder;

Figure 2 is a fragmentary perspective view showing the construction of the locating and locking detent on the attaching arm of the nut holder represented in Figure 1;

Figure 3 is a side elevational view of an assembled nut and nut holder as initially applied to attach the same to an aperture part, and with the subsequent position thereof substantially as represented in dotted lines;

Figure 4 is a sectional view showing the assembled nut and nut holder in final attached position with a bolt about to be applied thereto to complete a fastening installation;

Figure 5 is a sectional view taken on line 5—5 of Figure 4 looking in the direction of the arrows; and, Figure 6 is a view looking from the underside of Figure 3 showing the application of the nut holder in substantially the position illustrated in dotted lines in Figure 3.

Figure 7 is a bottom plan view of another form of nut holder embodying an attaching arm and auxiliary supporting hook construction similar to the nut holder shown in Figures 1-6 inclusive; and, Figure 8 is a sectional view showing the nut holder of Figure 7 in attached position on an apertured part.

Figure 9 is a perspective view of another form of nut holder which is generally similar in construction to that of Figure 1 and embodies a modified form of nut retaining means and an arched nut supporting arm or base which serves as a spring lock washer for the nut; and, Figure 10 is a sectional view showing the application and use of the nut holder of Figure 9 in a completed installation.

Figure 11 is an end elevational view of a further form of nut holder having an arched base and resilient bolt engaging elements for providing a thread locking action on the bolt;

Figure 12 is a side elevational view of the nut holder shown in Figure 11;

Figure 13 is a sectional view of an installation in which the nut holder of Figures 11 and 12 is seen in end elevation in the assembly, and illustrates the bolt locking action provided by this form of nut holder; and, Figure 14 is a top plan view of Figure 13.

Generally speaking, a nut holder constructed in accordance with the present invention is best provided from any suitable sheet metal strip material, preferably tempered spring metal or cold rolled metal having spring-like characteristics. The nut holding portion of the device may be provided in various forms to accommodate any selected type of nut, together with an improved attaching means including an attaching arm, or the like and an auxiliary supporting hook. Preferably the attaching arm is provided with a locking detent serving as an indexing or positioning means together with an adjacent sight opening which advantageously facilitates application of the nut holder to the attached fastening position of the nut carried thereby.

Referring now, more particularly, to the drawings, Figure 1 shows one form of the improved nut holder in which a sheet metal strip is bent into a substantial S-shape to define a pair of cooperating nut holding arms comprising a top arm 1 and an intermediate arm or base 2 having aligned bolt passages 3, 4, respectively. Said nut holding arms 1, 2, are spaced by a connecting portion or web 5 and are designed to hold, in frictionally and grippingly assembled relation therebetween, any selected form of nut, N, Figure 4.

In the present example, a standard square nut N is shown retained in clamped relation between the arms 1, 2, and is held against endwise displacement or removal from between said arms by a downwardly bent end flange or shoulder 6 engaging the adjacent outer end face of the nut. Preferably an upwardly flared tongue or guide surface 7 is provided on the extremity of said arm 1 in order to facilitate the initial application of the nut to clamped relation between said arms 1, 2, as aforesaid. In order to rigidify the arm 1 in such clamped relation with the nut, strengthening ribs 8 are provided at the junction of said arm with the adjacent connecting or web portion 5.

On the lower arm 2, there are provided upturned flanges 10 that are partially severed from said arm 2 to define nut retaining fingers having free ends which are bent to form inwardly extending shoulders 11 which engage the outer end face of the nut in cooperation with the flange or shoulder 6 on arm 1. Preferably the free ends of said fingers are provided with outwardly flaring yieldable guide surfaces 12 which facilitate the application of the nut to assembled relation with the nut holder. In an alternate construction similar side flanges 10 and fingers 11 may be provided on the top arm 1 of the nut holder with or without those on the arm 2, just described.

The arrangement of the arms 1, 2, of the nut holder otherwise is such that the nut N is readily snapped therebetween to a position in which the thread opening in the nut is aligned with the bolt passages 3, 4, in said arms, as best seen in Figure 4. In such assembled relation, the shoulder 6 on the top arm 1 and the shoulders 11 on the side flanges 10 engage the outer end faces of the nut, the flanges 10 engage the side faces thereof, and the web 5 engages the opposite end face of the nut to retain the same in assembled relation with the nut holder and prevent turning of the nut when a cooperating bolt is applied thereto and rotated to tightened fastening position. Assembly of the nut with the nut holder is facilitated by the outwardly tapered guide surface 7 on the top arm 1 in that the end face of the nut on being initially applied engages said guide surface in a camming action to cause the same to spread apart from the arm or base 2 as necessary to admit the nut between said arms to the assembled relation of the nut with the nut holder, whereupon the shoulder 6 snaps into engagement with the adjacent face of the nut. Similarly, in the initial application of the nut to assembled relation with the nut holder, the guide surfaces 12 on the side flanges 10 are cammed apart as necessary to permit the shoulders 11 to snap into retaining relation with the nut in cooperation with the shoulder 6 on the top arm 1 of the nut holder, as aforesaid.

In providing the bolt passage 4 in the arm 2 of the nut holder, the metal in this area is cut out except for an integral strip which is bent at the periphery of the bolt passage to form a shouldered hook 16 including a shoulder 15, Figure 4, extending in underlying relation to the arm 2 and spaced therefrom a distance approximating the thickness of the part to which the nut holder is to be attached. The hook 16 is suitably designed in the completed nut holder to pass through the bolt aperture 25 in the supporting part P, as illustrated in dotted lines in Figure 3, and to cooperate with the attaching arm 20 of the nut holder in supporting the nut holder on said part at spaced points, as seen in Figure 4, so that the attachment of the nut holder to the supporting part is one of high strength and rigidity.

The attaching arm 20 of the nut holder is formed by a generally U-shaped return bend of an end portion on the intermediate arm or base 2 and terminates substantially below the bolt passage 4 therein. As best seen in Figure 2, the extremity of the attaching arm 20 is recessed in a manner to define a suitable sight opening 22 and an adjacent locking projection or detent 23. Preferably, said detent 23 is formed from a marginal edge portion of the sight opening 22 to define a generally semicircular indexing or positioning element which snugly engages the periphery of a bolt opening in a part to retain the assembled nut and nut holder in attached position thereon. The locking detent 23 preferably has its upper edge surface tapered generally downwardly and outwardly toward the free end of arm 20 to define an inclined cam surface which provides a flared opening between said arm 20 and the cooperating intermediate arm or base 2.

As best seen in Figures 3 and 4, with the assembled nut and nut holder provided substantially as aforesaid, the attaching arm 20 is adapted to be applied over an edge of part P to a position in which the nut holder retains the nut N in registration with the bolt opening 25 in said part. In the initial application of the nut holder as seen in Figure 3, the hook 16 passes over the part P on the side opposite to that at which the attaching arm 20 is disposed, and as the nut holder is pushed to the position represented in dotted lines, said hook 16 is received in the bolt opening 25 and is adapted to extend therethrough to the same side of the part P which is engaged by the attaching arm 20. Thus, when the nut holder is pushed to its fully attached position, shown in Figure 4, the hook 16 engages the marginal portion of part P adjacent the bolt opening 25 and cooperates with the attaching arm 20 in supporting the nut holder in fully attached position.

Preferably, the normal spacing of the resilient attaching arm 20 from cooperating intermediate arm 2 is somewhat less than the thickness of part P such that said attaching arm 20 must be spread slightly outwardly over the edge of said part. The nut holder is then pushed to the position represented in dotted lines in Figure 3, and in Figure 6, and finally to fully attached fastening position in which the arm 2 and attaching arm 20 resiliently clasp said part, as represented in Figure 4. In this respect, the inclined cam surface of the locking detent 23 defines a flared entrance at the leading end of the attaching arm 20 which facilitates the initial application thereof to part P by causing a gradual outward camming of said arm as necessary to clear the edge of the part easily and quickly. In such initially applied position, as shown in plan in Figure 6, the sight opening 22 on the attaching arm 20 leaves the bolt passage 25 in part P uncovered and fully visible such that the attaching arm of the nut holder may be guided readily, in the least amount of time and effort, to the proper attaching position in which the locking detent 23 thereon will snap into said bolt opening 25 in the final applied fastening position of the nut on said part P, substantially as shown in Figures 4 and 5. The locking detent 23 is preferably semicircular, and thereby snugly engages a material edge portion of the circular bolt opening 25, as best seen in Figure 5, to lock the nut holder in fully attached position, while otherwise leaving a sufficiently large passage for receiving any suitable bolt fastener 26, Figure 4, to be applied to the nut N to secure a member M to said part P in a completed fastening installation.

The nut holder is applied to attached fastening position and functions in such attached fastening position substantially in the manner described whether the nut N is preassembled therewith or snapped into assembled relation with the nut holder after the nut holder has been first attached to the supporting part P, as aforesaid.

In any form of the invention, it will be appreciated that in the fully attached position of the nut holder, the shoulder 15, Figure 4, on the supporting hook 16 rigidly abuts a marginal portion of the bolt opening 25 to prevent shifting of the nut holder over said opening while the hook 16 grippingly engages the part P adjacent said opening in cooperation with the attaching arm 20. The nut holder is thus secured over the bolt opening at spaced points which provides an exceptionally strong attachment. The hook 16 otherwise removes any tendency toward displacement of the nut and nut carrying arm or base 2 from attached fastening position as a result of possible hinging of said nut carrying arm 2 away from the part P, as might be the case when the attaching arm 20 only is employed without the benefit of said supporting hook 16. In addition, the detent 23, on the attaching arm 20 serves to lock the nut holder in attached position, as aforesaid, and accordingly, the various described securing and attaching elements all cooperate in providing an improved highly practical nut holder which may be attached in a minimum of time and effort to provide a strong, durable and locked installation of the nut and nut holder in attached position on the part to be secured.

Figures 7 and 8 show a further form of the invention in which the nut holder embodies an attaching arm 20 and auxiliary supporting hook 16 which are generally similar in construction, application and use to that described with reference to Figures 1–6 inclusive. The attaching arm 20 and the cooperating nut carrying arm 30 may be made as long as necessary in order that the nut N' may be positioned over a bolt opening 25' a relatively greater distance inwardly of the edge of the panel P'. Adjacent the connected portions of said arms, the width of the strip is reduced so that the flexibility of said arms is increased in order to facilitate the application of the nut holder to attached fastening position. The nut N' may be of any type which is riveted, welded or similarly attached over a suitable opening in the nut supporting arm 30. In the present example, the nut carrying arm 30 is provided with a rectangular opening 31 and the nut N' is of standard rectangular design having on its underface projecting lugs 35 which are so spaced and designed as to be received within said opening 31 in snug engagement with the corner recesses thereof so that turning of the nut in said opening is prevented. The lugs 35 are peened or otherwise deformed so as to overlap the adjacent marginal portion of said opening 31 and thereby firmly and rigidly unite the nut N' to the nut carrying arm 30. The auxiliary supporting hook 16 is formed from an integral tongue or strip portion which is provided for in the cutout which is made in forming the opening 31 in the nut carrying arm 30 and this strip is bent to define the required auxiliary supporting hook 16. The completed nut holder shown in Figures 7 and 8, accordingly, embodies the same general attaching features as that described with reference to Figures 1–6 inclusive and is adapted for application and use in the same general manner. A divisional application Serial Number 219,491, filed April 5, 1951, is directed to the fastening device shown in Figs. 7 and 8.

Figures 9 and 10 show another form of nut holder having attaching means comprising an attaching arm 20 and an auxiliary supporting hook 16 in a construction generally similar to that of Figures 1–6 inclusive. The nut carrying portion, however, includes a highly advantageous arrangement for providing the nut with the equivalent of a spring locking washer and this is accomplished by means of a longitudinally bowed or arched base on the nut carrying arm 42. Preferably said arched arm or base 42 is provided without side flanges or other rigid elements which would interfere with the resilient spring action afforded by the curved or arched formation of said base. To this end, there are employed spaced nut retaining abutments 43 which have no effect on the spring action of the arched base 42 and these elements are readily provided by simple slits in said arched base 42 with the material adjacent said slits formed into protuberances in such a way that the slit edge of a protuberance defines a sharp abutment for engaging the adjacent end face of the nut N, Figure 10. Downwardly bent side flanges 45 on the top arm 1 hold the nut against lateral displacement from assembled relation in the nut holder while the shoulder 6 on the free end of said top arm 1 cooperates with the aforesaid abutments 43 to retain the nut against endwise displacement or removal. In the application and use of this form of nut holder in an installation such as shown in Figure 10, the nut holder is attached in the manner described with reference to Figures 1–6 inclusive. When the bolt 26 is applied and tightened the resilient arched base 42 is flattened by the clamping face of the nut to serve as a washer and also exerts a constant axial or outward force on the clamping face of the nut so that the threads of the nut have a binding, frictional engagement with the threads of the bolt and thereby provide an effective lock which prevents loosening of the bolt from tightened fastening position.

Figures 11-14 inclusive disclose a related type of nut holder which includes means for providing a locking action on the bolt in tightened fastening position in a manner equivalent to that just described. This form of the invention is generally similar to that of Figures 1-6 inclusive as respects the attaching means comprising the return bent attaching arm 29 and the auxiliary supporting hook 16 depending from the base or nut supporting arm 52 of the nut holder. Said arm 52 is bowed or arched generally transversely as best seen in Figure 11, and includes upwardly bent side walls 53 which engage the side faces of the nut N, and inturned flanges 54 extending over the top of the nut to retain the same in assembled relation in the nut holder. The extremities of said inturned flanges 54 terminate in arcuate thread engaging portions 55 conforming to the thread convolution on the bolt 26 for threadedly engaging the same, as shown in Figures 13 and 14. The arched base or nut carrying arm 52 of the nut holder is provided with spaced abutments 56 for engaging opposite end faces of the nut and thereby cooperate with the side walls 53 and top flanges 54 in holding the nut N in assembled relation with the nut holder as illustrated in Figures 11 and 13. Preferably said abutments 56 are formed by protuberances pressed out of the plane of the arm 52 adjacent slits therein, as described with reference to the embodiment of Figures 9 and 10, inasmuch as such spaced individual abutments do not interfere with the resilient spring action of the arched or bowed base 52 of the nut holder. In the normal untensioned relation of the nut holder, as shown in Figures 11 and 12, the hook 16 depends from the arched base 52 a slightly less distance than the general plane of the attaching arm 29 so that when the arched base 52 is flattened on application of the nut holder to attached position, said hook 16 extends in substantially the same plane as said attaching arm 29, and consequently, has the same general function as in the previously described forms of the invention.

In the application and use of this form of nut holder in an installation such as shown in Figure 13, the nut holder is attached in the manner described with reference to Figures 1-6 inclusive. When the bolt 26 is applied and tightened, the resilient arched base 52 is flattened by the nut to serve as a washer and also exerts a constant outward force on the clamping face of the nut so that the thread convolutions in the nut have a binding, frictional engagement with the thread convolutions on the bolt and thereby provide an effective lock which prevents loosening of the bolt from tightened fastening position in this respect.

Flattening of the arched base 52 forces the side walls 53 of the nut holder, Figure 11, inwardly into contact with the side faces of the nut N as seen in Figure 13, and simultaneously, the top flanges 54 carried by said side walls 53, are urged inwardly toward each other such that the arcuate thread portions 55 thereon slightly overhang the thread opening in the nut N. As the bolt 26 passes through the nut to tightened fastening position, the leading end of the bolt spreads said arcuate thread portions 55 apart as necessary for the bolt to pass therebetween in uniform threaded engagement therewith as seen in Figures 13 and 14. The action is such that said arcuate thread portions 55 exert a constant gripping action on the bolt thread under spring tension to provide an automatic thread lock on the bolt which prevents loosening or reverse turning of the bolt from tightened fastening position. This thread locking action together with that effected by the arched base 52 of the nut holder, as aforesaid, provides an installation in which the bolt is securely locked against loosening under the most severe conditions of vibration or shock. A divisional application Serial Number 219,642, filed April 6, 1951, is directed to the fastening devices shown in Figs. 9-14, inclusive.

While the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A fastener comprising a sheet metal body bent to provide a pair of arms extending in the same general direction and adapted to clasp an apertured part therebetween to hold the fastener in fastening position thereon, one of said arms being an attaching arm for engaging said part adjacent the aperture therein and including a projection receivable in said aperture to lock the fastener in attached position, the other arm being a nut carrying arm provided with means for retaining a nut thereon comprising a return bent arm for engaging the top of the nut and a downwardly projecting shoulder on said return bent arm for engaging a face of the nut adjacent said shoulder, side flanges extending upwardly from said nut carrying arm for engaging faces of the nut adjacent said side flanges, said nut carrying arm having an opening which registers with the bolt passage in the nut and a preformed hook depending from the edge of said opening, said preformed hook projecting below said nut carrying arm and extending in the same general direction as said attaching arm for engaging a marginal portion of the aperture in said part in cooperation with the attaching arm and said projection thereon, said preformed hook comprising an integral strip provided from the material of said nut carrying arm inside the periphery of said opening therein, and said strip being return bent downwardly and outwardly from said nut carrying arm to provide said preformed hook.

2. A fastener comprising a sheet metal body bent to provide a pair of arms extending in the same general direction and adapted to clasp an apertured part therebetween to hold the fastener in fastening position thereon, one of said arms being an attaching arm for engaging said part adjacent the aperture therein and including a projection receivable in said aperture to lock the fastener in attached position, the other arm being a nut carrying arm provided with means for retaining a nut thereon comprising a return bent arm for engaging the top of the nut, said return bent arm having its end portion provided with a downwardly projecting shoulder for engaging a face of the nut adjacent said shoulder and an upwardly flared guide surface for facilitating insertion of the nut under said return bent arm, side flanges extending upwardly from said nut carrying arm for engaging faces of the nut adjacent said side flanges, said side flanges having free ends provided with inwardly extending shoulders and outwardly flaring guide surfaces for facilitating insertion of the nut between said side flanges, said nut carrying arm having an opening which registers with the bolt passage in the nut and a preformed hook depending from the edge of said opening, said preformed hook projecting below said nut carrying arm and extending in the same general direction as said attaching arm for engaging a marginal portion of the aperture in said part in cooperation with the attaching arm and said projection thereon, said preformed hook comprising an integral strip provided from the material of said nut carrying arm inside the periphery of said opening therein, and said strip being return bent downwardly and outwardly from said nut carrying arm to provide said preformed hook.

GEORGE A. TINNERMAN.

REFERENCES CITED

The following references are of record in the file of this patent:

UNITED STATES PATENTS

| Number | Name | Date |
| --- | --- | --- |
| 2,079,917 | Mitchel | May 11, 1937 |
| 2,079,918 | Mitchel | May 11, 1937 |
| 2,198,439 | Kost | Apr. 23, 1940 |
| 2,274,014 | Tinnerman | Feb. 24, 1942 |
| 2,382,942 | Murphy | Aug. 14, 1945 |
| 2,394,729 | Tinnerman | Feb. 12, 1946 |